United States Patent
Tsubokura et al.

(10) Patent No.: US 9,864,223 B2
(45) Date of Patent: *Jan. 9, 2018

(54) DISPLAY DEVICE, ELECTRONIC APPARATUS, AND MANUFACTURING METHOD OF DISPLAY DEVICE

(71) Applicant: Japan Display Inc., Tokyo (JP)

(72) Inventors: Nobuo Tsubokura, Tokyo (JP); Isao Hashimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,598

(22) Filed: Nov. 29, 2016

(65) Prior Publication Data

US 2017/0075162 A1 Mar. 16, 2017

Related U.S. Application Data

(63) Continuation of application No. 14/212,765, filed on Mar. 14, 2014, now Pat. No. 9,541,781.

(30) Foreign Application Priority Data

Mar. 26, 2013 (JP) ................................. 2013-065176

(51) Int. Cl.
*G02F 1/1339* (2006.01)
*G02F 1/1333* (2006.01)
(Continued)

(52) U.S. Cl.
CPC ........ *G02F 1/133308* (2013.01); *B60K 35/00* (2013.01); *G02F 1/133528* (2013.01);
(Continued)

(58) Field of Classification Search
CPC ......... G02F 1/133308; G02F 1/133528; G02F 2001/133317; G02F 2001/133322; G02F 2201/56; B60K 35/00; B60K 2350/2039
See application file for complete search history.

(56) References Cited

U.S. PATENT DOCUMENTS 6,490,992 B2 12/2002 Olbrich et al.
7,121,674 B2 * 10/2006 Kraus .................... B60K 37/02
362/23.1
(Continued)

FOREIGN PATENT DOCUMENTS

JP 57-035833 2/1982
JP 2000-250050 9/2000
(Continued)

OTHER PUBLICATIONS

Japanese Office Action dated Jan. 26, 2016 in corresponding Japanese Application No. 2013-065176.

*Primary Examiner* — Nathanael R Briggs
(74) *Attorney, Agent, or Firm* — K&L Gates LLP (57) ABSTRACT

A display device for displaying an image on a display surface includes a liquid crystal panel having the display surface, the liquid crystal panel with a first through hole formed in the display surface, a backlight disposed oppositely to the liquid crystal panel, the backlight with a second through hole formed at a position overlapping with the first through hole, and a cap inserted into the first through hole and the second through hole. The cap includes a tube portion with a third through hole formed, the third through hole parallel to the first through hole and the second through hole, and a flange portion formed at least one end of the tube portion, the flange portion having an outer diameter larger than a diameter of the first through hole, and larger than a diameter of the second through hole.

5 Claims, 6 Drawing Sheets

(51) Int. Cl.
*B60K 35/00* (2006.01)
*G02F 1/1335* (2006.01)

(52) U.S. Cl.
CPC .......... *B60K 2350/2039* (2013.01); *G02F 2001/133317* (2013.01); *G02F 2001/133322* (2013.01); *G02F 2201/56* (2013.01)

(56) References Cited

U.S. PATENT DOCUMENTS

| | | | |
|---|---|---|---|
| 2013/0058113 A1* | 3/2013 | Suess | B60K 35/00 362/509 |
| 2013/0176118 A1 | 7/2013 | Nagara et al. | |

FOREIGN PATENT DOCUMENTS

| | | | |
|---|---|---|---|
| JP | 2000250050 A | * | 9/2000 |
| JP | 2003-167241 | | 6/2003 |
| JP | 2010-139657 | | 6/2010 |

\* cited by examiner

DISPLAY DEVICE, ELECTRONIC APPARATUS, AND MANUFACTURING METHOD OF DISPLAY DEVICE

CROSS REFERENCES TO RELATED APPLICATIONS

The present application is a continuation application of U.S. patent application Ser. No. 14/212,765, filed on Mar. 14, 2014, which application claims priority to Japanese Priority Patent Application JP 2013-065176 filed in the Japan Patent Office on Mar. 26, 2013, the entire content of which is hereby incorporated by reference.

BACKGROUND

1. Field of the Invention

The present disclosure relates to a display device provided with a liquid crystal panel, relates to an electronic apparatus provided with such a display device, and relates to a manufacturing method of the display device.

2. Description of the Related Art

In recent years, as a display device mounted on an electronic apparatus such as vehicle meter and clock, there is proposed a structure including an analog display unit having an indicator needle rotated by a driving unit via a rotational shaft and a liquid crystal display unit having a liquid crystal panel, in order to improve luxury taste or the like. In such a display device, a through hole is formed in the liquid crystal panel, a backlight and the like, and the rotational shaft is passed through the through hole.

Japanese Patent Application Laid-open No. 2010-139657 describes a liquid crystal panel including a first substrate, a second substrate oppositely disposed relative to the first substrate, a first seal member disposed between the first and second substrates for surrounding a liquid crystal, and a second seal member disposed in a region surrounded by the first seal member. A through hole is formed passing through the first and second substrates and the second seal member. Japanese Patent Application Laid-open No. 2010-139657 also describes a display device including the liquid crystal panel, a backlight, a rotational shaft, and an indicator needle, in which the backlight is disposed on a back surface side of the liquid crystal panel and provided with a backlight through hole formed therein, the rotational shaft is inserted through the through hole of the liquid crystal panel and the backlight through hole of the backlight, and the indicator needle is disposed on a display surface side of the liquid crystal panel, and connected to the rotational shaft.

In the display device described in Japanese Patent Application Laid-open No. 2010-139657, the through holes into which the rotational shaft is inserted are formed. The display device has a space between the through holes and the rotational shaft to enable the rotational shaft to freely rotate. Thereby, foreign substances may enter in this display device from the through holes.

SUMMARY

It is an object of the present invention to at least partially solve the problems in the conventional technology.

There is disclosed a display device for displaying an image on a display surface, the display device including a liquid crystal panel having the display surface, the liquid crystal panel with a first through hole formed in the display surface, a backlight disposed oppositely to the liquid crystal panel, the backlight with a second through hole formed at a position overlapping with the first through hole, and a cap inserted into the first through hole and the second through hole. The cap includes a tube portion with a third through hole formed, the third through hole parallel to the first through hole and the second through hole, and a flange portion formed at least one end of the tube portion, the flange portion having an outer diameter larger than a diameter of the first through hole, and larger than a diameter of the second through hole.

There is disclosed an electronic apparatus including the aforementioned display device, a control unit to supply an input signal to the display device, and a movement mechanism. The movement mechanism includes an indicator needle disposed along the display surface of the display device, a rotational shaft inserted into the third through hole, and a motor to rotate the rotational shaft, the motor disposed on an opposite side of the display device from the display surface.

There is disclosed a method for manufacturing a display device with a through hole formed in a display surface on which an image is displayed. The method includes aligning a liquid crystal panel having a first through hole formed and a backlight having a second through hole formed so that the first through hole and the second through hole overlap with each other, and inserting a cap into the first through hole and the second through hole. The cap includes a tube portion with a third through hole formed, the third through hole parallel to the first through hole and the second through hole, and a flange portion formed at least one end of the tube portion, the flange portion having an outer diameter larger than a diameter of the first through hole, and larger than a diameter of the second through hole.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

DETAILED DESCRIPTION

The present disclosure will now be described according to the following orders and with reference to the accompanying drawings:

<1. Electronic Apparatus Unit>
An example of a device to which an electronic apparatus according to an embodiment of the present disclosure is applicable;

<2. Electronic Apparatus>
A configuration of the electronic apparatus according to the present embodiment; and <3. Manufacturing Method of Display Device>

<1. Electronic Apparatus Unit>

First, an explanation will be made on a case where an electronic apparatus including a display device according to the present embodiment is applied to a meter unit mounted on an instrumental panel of an automobile, for example.

<1-1. Configuration of Electronic Apparatus>

Figure 1:
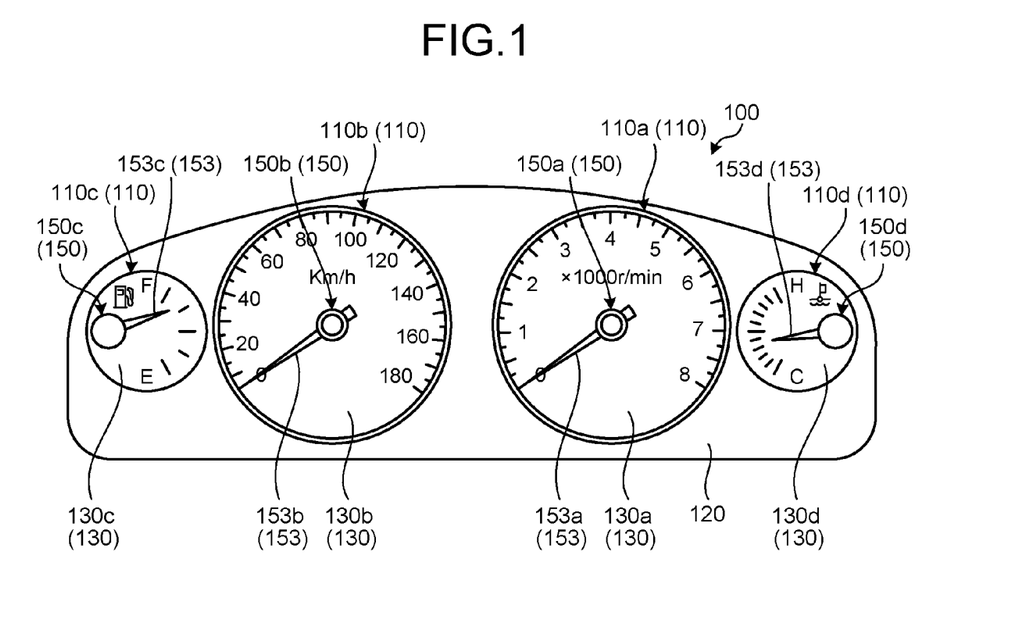
FIG. 1 is a schematic view illustrating a general configuration of a meter unit according to the present embodiment.

FIG. 1 is a schematic view illustrating a general configuration of a meter unit according to the present embodiment. A meter unit (an electronic apparatus unit) 100 illustrated in FIG. 1 includes a plurality of instruments (electronic apparatuses) 110a, 110b, 110c, and 110d, and a face panel 120 that holds the instruments 110a, 110b, 110c, and 110d. The instrument 110a is a tachometer. The instrument 110a has a display device 130a and a movement mechanism 150a. The instrument 110a is configured to inform a user (e.g. a drive or the like) the current number of revolutions by moving (rotating) an indicator needle 153a of the movement mechanism 150a on revolution scale marks displayed on the display device 130a. The instrument 110b is a speed meter. The instrument 110b has a display device 130b and a movement mechanism 150b. The instrument 110b is configured to inform the user the current speed by moving (rotating) an indicator needle 153b of the movement mechanism 150b on speed scale marks displayed on the display device 130b. The instrument 110c is a fuel gauge. The instrument 110c has a display device 130c and a movement mechanism 150c. The instrument 110c is configured to inform the user the current amount of remaining fuel by moving (rotating) an indicator needle 153c of the movement mechanism 150c on fuel level scale marks displayed on the display device 130c. The instrument 110d is a water temperature gauge. The instrument 110d has a display device 130d and a movement mechanism 150d. The instrument 110d is configured to inform the user the current water temperature by moving (rotating) an indicator needle 153d of the movement mechanism 150d on temperature scale marks displayed on the display device 130d.

<2. Electronic Apparatus>

An explanation will now be made on the instruments (the electronic apparatuses) 110a, 110b, 110c, and 110d included in the meter unit (the electronic apparatus unit) 100. The instruments (the electronic apparatuses) 110a, 110b, 110c, and 110d have basically the same configuration except that displayed images and positions to form the movement mechanisms are different from each other. In the following explanation, the instruments (the electronic apparatuses) 110a, 110b, 110c, and 110d are referred to collectively as instrument 110. Similarly, the display devices 130a, 130b, 130c, and 130d are referred to collectively as display device 130, the movement mechanisms 150a, 150b, 150c, and 150d are referred to collectively as movement mechanism 150, and the indicator needles 153a, 153b, 153c, and 153d are referred to collectively as indicator needle 153.

Figure 2:
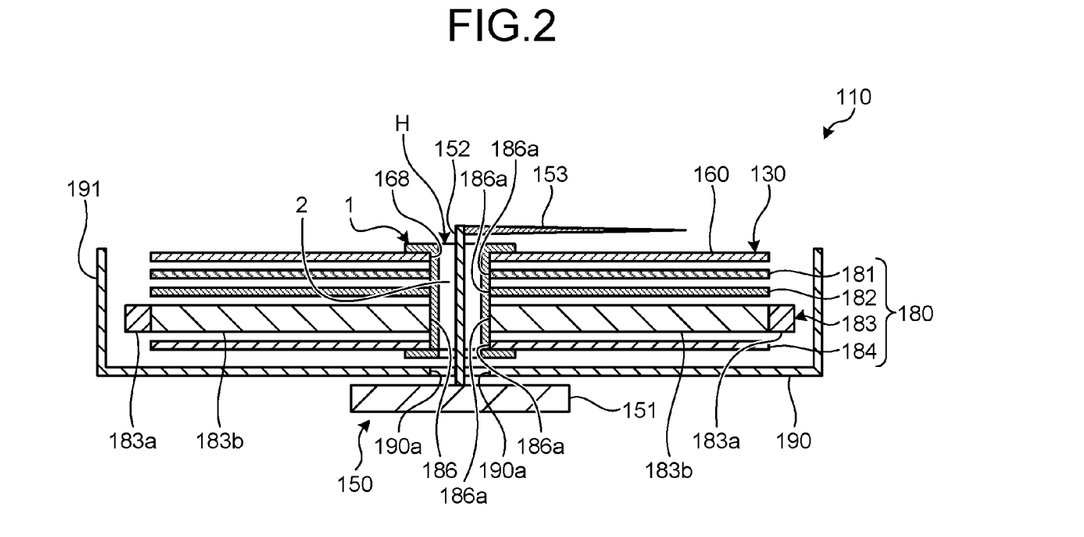
FIG. 2 is a schematic view illustrating a cross section of one of the instruments included in the meter unit illustrated in FIG. 1.
Figure 3:
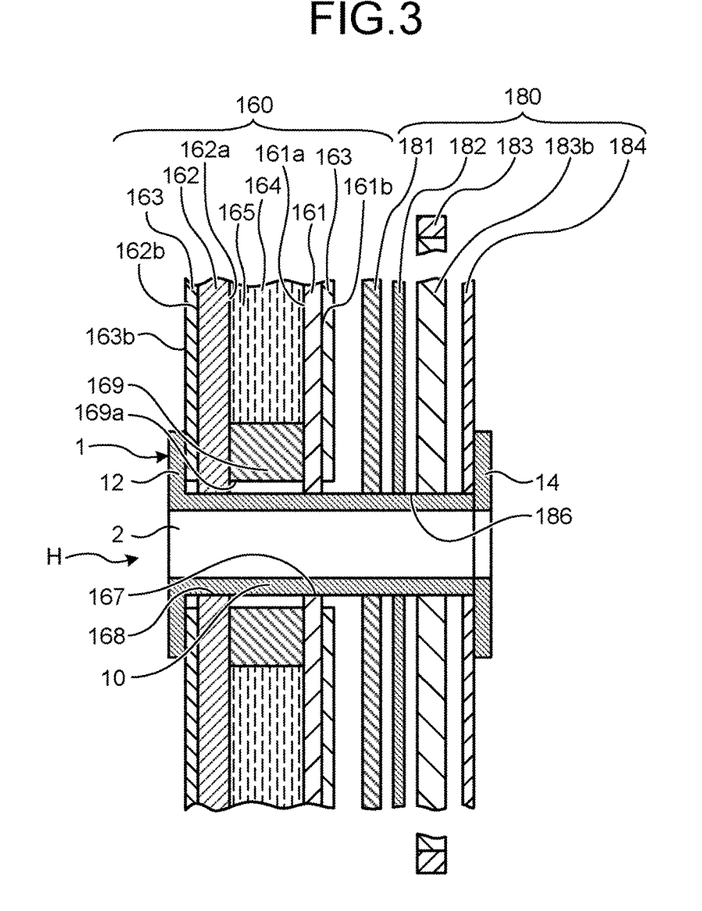
FIG. 3 is an enlarged cross sectional view illustrating peripheral portions of through holes of a liquid crystal panel and a backlight illustrated in FIG. 2.

FIG. 2 is a schematic view illustrating a cross section of one of the instruments included in the meter unit illustrated in FIG. 1. FIG. 3 is an enlarged cross sectional view illustrating peripheral portions of through holes of a liquid crystal panel and a backlight illustrated in FIG. 2. As illustrated in FIGS. 2 and 3, the instrument 110 includes the display device 130 as an image display unit and the movement mechanism 150 as an analog display unit as mentioned above.

As illustrated in FIG. 2, the display device 130 includes a liquid crystal panel 160 that has a first through hole (a liquid-crystal-panel through hole) H formed therein, a backlight unit 180 that is formed on a back surface side of the liquid crystal panel 160 and that has a second through hole (a backlight through hole) 186 formed therein, and a frame 190 that houses the liquid crystal panel 160 and the backlight unit 180. The display device 130 also includes a cap 1 that is inserted through the first through hole H and the second through hole 186 and that has a third through hole 2 formed therein. The liquid crystal panel 160 according to the present embodiment is a liquid crystal panel using TFT (Thin Film Transistor) elements as drive elements. The first through hole H is formed in the middle of a display region within the display surface. However, the position where the first through hole H is to be formed is not limited to a geometrical center of the display region. So long as such a position is located within the display surface, the position where the first through hole H is to be formed is not limited to any specific position.

As illustrated in FIG. 3, the liquid crystal panel 160 includes a TFT substrate (a first substrate) 161 and a counter substrate (a second substrate) 162. A liquid crystal region 165 where a liquid crystal 164 is filled is formed between the TFT substrate 161 and the counter substrate 162.

The TFT elements, pixel electrodes, common electrodes, an orientation film, and the like, which are not illustrated in FIG. 2 or FIG. 3, are formed on a front surface 161a of the TFT substrate 161 in a stacking manner. A polarization plate 163 is placed on a back surface 161b of the TFT substrate 161. A flexible printed circuit (FPC) and a drive integrated circuit (IC) for driving the liquid crystal, which are not illustrated, are also provided on the TFT substrate 161. Color filters, an orientation film, and the like, which are not illustrated in FIG. 2 or FIG. 3, are provided on a front surface 162a of the counter substrate 162 in a stacking manner. Another polarization plate 163 is placed on a back surface 162b of the counter substrate 162. In this embodiment, a back surface 163b of this another polarization plate 163 becomes the display surface on which an image is displayed. Specifically, the image is displayed in a display region within the display surface.

A main seal (not illustrated) that seals the liquid crystal 164 between the TFT substrate 161 and the counter substrate 162 is formed on either the front surface 161a of the TFT substrate 161 or the front surface 162a of the counter substrate 162. A through hole seal 169 that seals the liquid crystal 164 between the TFT substrate 161 and the counter substrate 162 is formed on either the front surface 161a of the TFT substrate 161 or the front surface 162a of the counter substrate 162.

The liquid crystal panel 160 has a structure in which the TFT substrate 161 and the counter substrate 162 are bonded together in a state where the front surface 161a and the front surface 162a face each other. In the liquid crystal panel 160, the liquid crystal 164 is sealed between the TFT substrate 161 and the counter substrate 162 by the main seal serving as a first seal member, thereby forming the liquid crystal region 165. In the liquid crystal panel 160, the through hole seal 169 serving as a second seal member is formed in the liquid crystal region 165.

As illustrated in FIGS. 2 and 3, the first through hole H passing through from the TFT substrate 161 to the counter substrate 162 is formed in the liquid crystal panel 160. The first through hole H is provided to pass through the through hole seal 169. In the through hole H, an inner diameter of a hole 167 provided in the TFT substrate 161 is smaller than an inner diameter of a hole 169a of the through hole seal 169, and an inner diameter of a hole 168 provided in the counter substrate 162 is smaller than the inner diameter of the hole 169a of the through hole seal 169.

Thereby, as illustrated in FIG. 3, the display panel 11 has a structure in which the inner wall of the hole 167 of the TFT substrate 161 in the vicinity of the through hole H and the inner wall of the hole 168 of the counter substrate 162 in the vicinity of the through hole are supported by the through hole seal 169. Thus, the periphery of the inner wall of the hole 167 of the TFT substrate 161 and the periphery of the inner wall of the hole 168 of the counter substrate 162 are supported by the through hole seal 169. Thereby, an inside of the liquid crystal panel 160, i.e. a region in which the liquid crystal is filled and sealed or a region in which TFTs are formed, is not exposed in the first through hole H from the through hole seal 169.

The backlight unit 180 has a configuration in which a prism sheet 181, a diffusion plate 182, a backlight 183, and a reflection plate 184 are stacked one on top of another, as illustrated in FIGS. 2 and 3. The backlight unit 180 is disposed on the back surface side of the liquid crystal panel 160 and configured to irradiate a display region of the liquid crystal panel 160 with light. The second through hole 186 is formed in the backlight unit 180. The prism sheet 181, the diffusion plate 182, the backlight 183, and the reflection plate 184 have their respective through holes 186a formed in advance. The backlight through hole 180 can be formed by aligning the through holes 186a respectively formed in the prism sheet 181, the diffusion plate 182, the backlight 183, and the reflection plate 184 so as to making one through hole by stacking the prism sheet 181, the diffusion plate 182, the backlight 183, and the reflection plate 184. Thus, by forming the respective through holes 168a in advance for the prism sheet 181, the diffusion plate 182, the backlight 183, and the reflection plate 184, respectively, it is possible to reduce or suppress the increase in the number of manufacturing processes for fabricating the backlight 180.

In the present embodiment, the backlight 183 includes a light-emitting diode (LED) 183a serving as a light source and a light guide plate 183b guiding the light emitted from the LED 183a.

As illustrated in FIG. 2, the frame 190 includes an outer circumferential wall 191 and is formed in a cylindrical shape with a front surface thereof opened. A through hole 190a is formed on a bottom surface of the frame 190. The display device 130 is formed by housing the liquid crystal panel 160 and the backlight unit 180 within the outer circumferential wall 191 of the frame 190. In the display device 130, the first through hole H, the second through hole 186 of the backlight unit 180, and the through hole 190a of the frame 190 are in a continuous state to form one through hole together.

Figure 4:
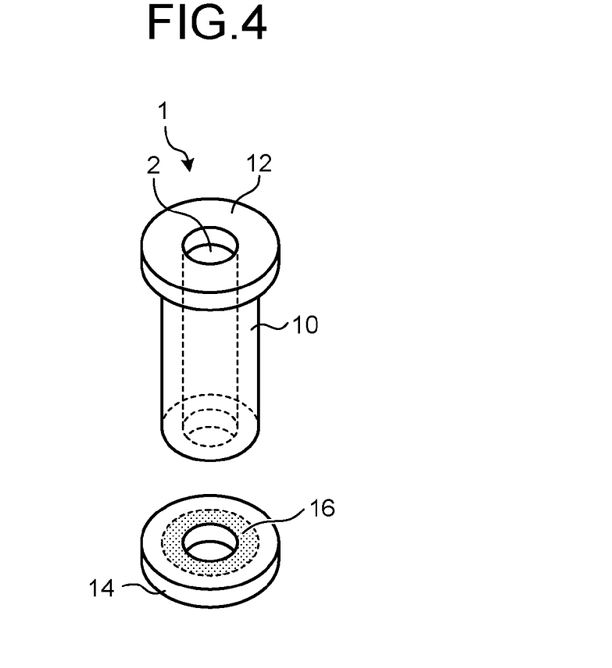
FIG. 4 is a perspective view illustrating a general configuration of the cap.

An explanation will now be made on the cap 1 with reference to FIGS. 2 to 4. FIG. 4 is a perspective view illustrating a general configuration of the cap. As illustrated in FIGS. 2 and 3, the cap 1 is inserted into the first through hole H and the second through hole 186. The cap 1 has a tube portion 10, a flange portion 12 connected to one end of the tube portion 10, and a flange portion 14 connected to the other end of the tube portion 10.

The tube portion 10 has a cylindrical shape. A hollow portion inside of the cylindrical shape serves as the third through hole 2. The tube portion 10 is inserted into the first through hole H and the second through hole 186 which are aligned to form one through hole. Thus, the outer circumferential surface of the tube portion 10 faces the first through hole H and the second through hole 186. The tube portion 10 has a length in the axial direction of the cylindrical shape substantially equal to the sum of that of the first through hole H and that of the second through hole 186, and the outer circumferential surface thereof has a diameter substantially the same as or slightly smaller than an inner diameter of the first through hole H and the second through hole 186. The tube portion 10 is placed all over the first through hole H and the second through hole 186 in the axial direction of the holes of the first through hole H and the second through hole 186.

The flange portion 12 is connected to one end of the tube portion 10, specifically an end of the tube portion 10 on the side of the liquid crystal panel 160 in the axial direction. The flange portion 12 is a ring-shaped member having an opening formed on the center side and has an inner diameter equal to that of the tube portion 10 and an outer diameter larger than an opening diameter of the first through hole H and the second through hole 186. The flange portion 12 in the present embodiment is formed integrally with the tube portion 10 as illustrated in FIG. 4. The flange portion 12 is placed outside of the first through hole H and a surface of the flange portion 12 on the side of the liquid crystal panel 160 faces the liquid crystal panel 160. In the present embodiment, the surface of the flange portion 12 on the side of the liquid crystal panel 160 is in contact with the liquid crystal panel 160.

The flange portion 14 is connected to the other end of the tube portion 10, specifically an end of the tube portion 10 on the side of the backlight unit 180 in the axial direction. The flange portion 14 is a ring-shaped member having an opening formed on the center side and has an inner diameter equal to that of the tube portion 10 and an outer diameter larger than the opening diameter of the first through hole H and the second through hole 186. The flange portion 14 in the present embodiment is fixed to the tube portion 10 by adhesion or the like, as illustrated in FIG. 4. Specifically, an adhesive agent is applied to an adhesion area 16 of an inner-diameter side part of a surface of the flange portion 14 on the side of the tube portion 10. The adhesion area 16 of the flange portion 14 is contacted with an end surface of the tube portion 10 on the side of the flange portion 14 to be adhered to the tube portion 10. A substance or material to be applied to the adhesion area 16 is not limited to the adhesive agent and a double-faced tape can be used. The flange portion 14 is placed outside of the second through hole 186 and a surface of the flange portion 14 on the side of the backlight unit 180 faces the backlight unit 180. In the present embodiment, the surface of the flange portion 14 on the side of the backlight unit 180 is in contact with the backlight unit 180.

The cap 1 has a configuration as mentioned above, in which the tube portion 10 is placed on the inner sides of the first through hole H and the second through hole 186, the flange portion 12 closes an end on the side of the first through hole H, and the flange portion 14 closes an end on the side of the second through hole 186. Thereby, the cap 1 closes both ends in the axial direction in an area where the first through hole H and the second through hole 186 face the tube portion 10, using the flange portions 12 and 14. Therefore, the cap 1 closes openings of the liquid crystal panel 160 and the backlight unit 180 formed by the first through hole H and the second through hole 186. The cap 1 has the openings formed on the inner circumferential surface of the tube portion 10 and on the side of the inner diameters of the flange portions 12 and 14, so that the third through hole 2 is formed on the central axis side. Thereby, in the cap 1, a space opened outward is provided inside of the tube portion 10. The third through hole 2 is configured to be parallel to the first through hole H and the second through hole 186 when inserted into them.

The cap 1 closes the openings of the liquid crystal panel 160 and the backlight unit 180 formed by the first through hole H and the second through hole 186, thereby preventing foreign substances from entering inside of the liquid crystal panel 160 and the backlight unit 180 through the first through hole H and the second through hole 186, respectively. Thereby, a risk that foreign substances reach an area overlapping with the display surface and cause unevenness or a defect in an image or that the foreign substances reach a circuit and cause a malfunction of the circuit can be reduced.

In the cap 1, the flange portion 12 and the flange portion 14 each having the outer diameters larger than that of the first through hole H and that of the second through hole 186 respectively are arranged on the both ends of the third through hole 2 in the axial direction, thereby preventing the cap 1 from axially moving. Accordingly, the cap 1 can be fixed to the liquid crystal panel 160 and the backlight unit 180.

Referring back to FIG. 2, the instrument 110 is continuously explained. The movement mechanism 150 includes a motor 151 as a drive unit and the indicator needle 153 rotated by the motor 151 via a rotational shaft 152.

The instrument 110 is formed by combining the display device 130 and the movement mechanism 150 with each other. The motor 151 of the movement mechanism 150 is placed on a back surface side of the frame 190 that houses the liquid crystal panel 160 and the backlight unit 180. The rotational shaft 152 of the movement mechanism 150 is inserted through the first through hole H, the second through hole 186, the third through hole 2 of the cap 1, and the through hole 190a of the frame 190. In this way, the indicator needle 153 of the movement mechanism 150 is placed on the display surface side of the liquid crystal panel 160. The instrument 110 is capable of displaying a scale mark display, an alarm display, and the like on the display surface of the liquid crystal panel 160, and also capable of rotating the indicator needle 153 of the movement mechanism 150 on the display surface side of the liquid crystal panel 160.

As described above, in the instrument 110, the rotational shaft 152 of the movement mechanism 150 is inserted through the third through hole 2. Thereby, it is possible to achieve a structure in which the indicator needle 153 is placed on the display surface side of the display device 130, while other parts of the movement mechanism 150 than the indicator needle 153 are not exposed on the display surface side of the display device 130. This enables the indicator needle 153 and an image on the display device 130 to be easily viewed.

In the instrument 110, the cap 1 is provided on the inner sides of the first through hole H of the liquid crystal panel 160 and the second through hole 186 of the backlight unit 180 of the display device 130, thereby preventing foreign substances from entering inside of the liquid crystal panel 160 and the backlight unit 180 from the through hole side, as mentioned above.

The instrument 110 includes the backlight unit 180 provided on the back surface side of the liquid crystal panel 160. The motor 151 of the movement mechanism 150 is arranged on a back surface side of the backlight unit 180 and the rotational shaft 152 of the movement mechanism 150 is inserted through the third through hole 2. Therefore, the instrument 110 can realize the display device 130 with a simple configuration.

The instrument 110 uses an analog (i.e. real) indicator needle. Thereby, it is possible to reduce any irregular movement of the indicator needle even in a condition where a display response of the liquid crystal is slow, such as a low temperature condition. Specifically, in a case where an indicator needle is displayed as an image on the display device, if the response speed of the liquid crystal is slow, the image to be displayed cannot follow the information on needle movement which is input as an image signal. Thus, there may be a situation where no indicator needle is displayed on the display device of the vehicle meter. In contrast, according to the present embodiment, since the real indicator needle is used, it is possible to ensure that the indicator needle is always in a visible state.

The cap 1 is preferably made of a resin. When the cap 1 is made of a resin, scratches or the like on the liquid crystal panel 160 or the backlight unit 180 can be prevented even when the cap 1 contacts the liquid crystal panel 160 or the backlight unit 180.

Furthermore, the cap 1 is preferably made of a non-translucent resin. A non-translucent property is a property of not transmitting light and may be realized by using a colored resin, for example. Various colors including black can be used as the color. By using the cap 1 made of a non-translucent resin, the light irradiated to the liquid crystal panel 160 from the backlight unit 180 can be prevented from emitting through the third through hole 2, and/or can be prevented from emitting through a region where no pixel exists in the vicinity of the first through hole H on the display surface of the liquid crystal panel. Thereby, the cap 1 can prevent the light leakage.

Figure 5:
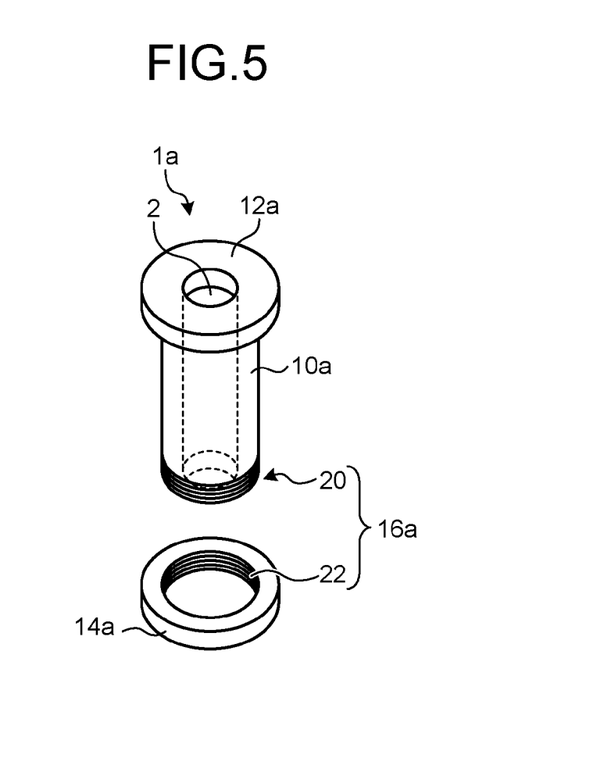
FIG. 5 is a perspective view illustrating a general configuration of another example of the cap.
Figure 6:
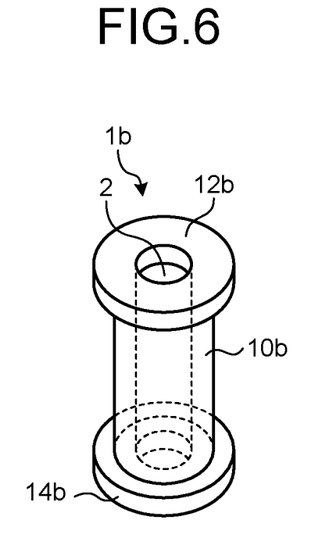
FIG. 6 is a perspective view illustrating a general configuration of still another example of the cap.

In the cap 1, the tube portion 10 and the flange portion 14 are connected by adhesion. However, the connection method is not limited thereto. FIGS. 5 and 6 are perspective views each illustrating a general configuration of other examples of the cap.

A cap 1a illustrated in FIG. 5 has a tube portion 10a and flange portions 12a and 14a. The cap 1a has a threaded portion 16a formed at a connection between the tube portion 10a and the flange portion 14a. Specifically, an external thread (male thread) 20 is formed on the tube portion 10a, an internal thread (female thread) 22 is formed on the flange portion 14a, and the external thread 20 and the internal thread 22 constitute the threaded portion 16a. In the cap 1a, the tube portion 10a can be connected with the flange portion 14a by rotating the tube portion 10a and the flange portion 14a relative to each other to engage the external thread 20 into the internal thread 22. Thus, similarly to the cap 1, it is possible for the cap 1a to connect the tube portion 10a with the flange portion 14a by a mechanical engaging mechanism. It is also possible for the cap 1a to adjust the position of the flange portion 14a relative to the tube portion 10a by rotating the tube portion 10a and the flange portion 14a relative to each other. Thus, a gap or distance between the flange portion 12a and the flange portion 14a can be adjusted. Therefore, it is possible to make sure that the flange portion 12a and the flange portion 14a are in contact with the liquid crystal panel 160 and the backlight unit 180, respectively. Furthermore, attachment or detachment between the tube portion 10a and the flange portion 14a can be easily achieved.

A cap 1b illustrated in FIG. 6 has a tube portion 10b, a flange portion 12b, and a flange portion 14b, which are integrally formed. When the flange portion 12b and the flange portion 14b are formed integrally with the tube portion 10b, the cap 1b is preferably formed of a stretchable and/or deformable elastic body. When using the cap 1b made of such an elastic body, it is possible to insert the cap 1b into the first through hole H of the liquid crystal panel 160 and the second through hole 186 of the backlight unit 180 by deforming the cap 1b, specifically deforming at least one of the flange portion 12b and the flange portion 14b. Thus, the tube portion 10b can be formed integrally with the flange portion 12b and the flange portion 14b to form the cap 1b.

In the cap 1, 1a, or 1b, the tube portion 10, 10a, or 10b is preferably in contact with the first through hole H and the second through hole 186. Specifically, it is preferable that the tube portion 10, 10a, or 10b is formed of an elastic body to apply a certain biasing force from the tube portion 10, 10a, or 10b to the first through hole H and the second through hole 186. When the tube portion 10, 10a, or 10b is pressed against the first through hole H and the second through hole 186, the first through hole H and the second through hole 186 can be closed by the tube portion 10, 10a, or 10b. When the tube portion 10, 10a, or 10b is pressed against the first through hole H and the second through hole 186, a state where the tube portion 10, 10a, or 10b does not easily move with respect to the first through hole H and the second through hole 186 can be achieved.

The cap 1, 1a, or 1b is not limited to a shape having the tube portion 10, 10a, or 10b, the flange portion 12, 12a, or 12b to contact with the display surface of the liquid crystal panel 160, and the flange portion 14, 14a, or 14b to contact with the back surface of the backlight unit 180 as in the embodiment mentioned above. It is sufficient that the cap 1, 1a, or 1b can close the first through hole H and the second through hole 186 and that the cap 1, 1a, or 1b includes at least the tube portion 10, 10a, or 10b. For example, so long as the tube portion 10 can close the first through hole H and the second through hole 186 as mentioned above, it is unnecessary to provide the flange portion 12, 12a, or 12b and the flange portion 14, 14a, or 14b.

The cap 1, 1a, or 1b preferably includes the flange portion 12, 12a, or 12b on the display surface of the liquid crystal panel 160 as in the embodiment mentioned above. When including the flange portion 12, 12a, or 12b, the cap 1, 1a, or 1b can prevent light from easily leaking from near the through hole on the display surface. This effect can be suitably obtained when the cap 1, 1a, or 1b is formed of a non-translucent resin, as mentioned above.

In the cap 1, 1a, or 1b, when the flange portion 12, 12a, or 12b is provided on the display surface of the liquid crystal panel 160 as in the embodiment mentioned above, it is preferable to bond the flange portion 12, 12a, or 12b to the display surface of the liquid crystal panel 160 by adhesion, sticking (pressure sensitive adhesion), or the like. Accordingly, the flange portion 12, 12a, or 12b and the display surface of the liquid crystal panel 160 can be closely contacted with each other to provide more secure closing. Similarly, when the flange portion 14, 14a, or 14b in the cap 1, 1a, or 1b is provided on the back surface of the backlight unit 180 as in the embodiment mentioned above, it is preferable to bond the flange portion 14, 14a, or 14b to the back surface of the backlight unit 180 by adhesion, sticking (pressure sensitive adhesion), or the like. Accordingly, the flange portion 14, 14a, or 14b and the back surface of the backlight unit 180 can be closely contacted with each other to provide more secure closing.

Figure 7:
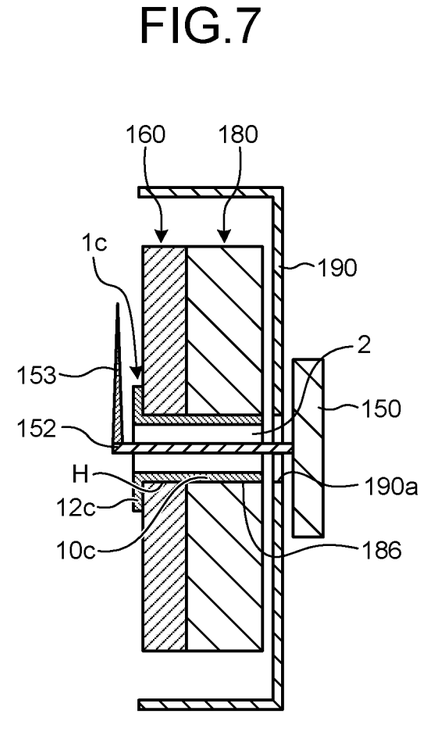
FIG. 7 is a schematic view illustrating an instrument according to another embodiment.
Figure 8:
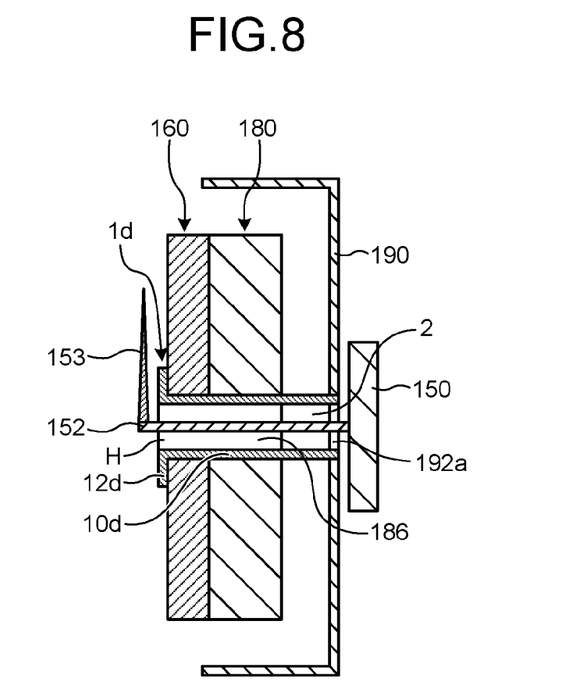
FIG. 8 is a schematic view illustrating an instrument according to still another embodiment.

FIGS. 7 and 8 are schematic views each illustrating an instrument according to other embodiments. The instruments (the electronic apparatuses) illustrated in FIGS. 7 and 8 have the same configuration as that of the instrument according to the aforementioned embodiment, except for shapes of caps. A cap 1c of the instrument illustrated in FIG. 7 includes a flange portion 12c only on the display surface side of the liquid crystal panel 160. That is, the cap 1c includes the flange portion 12c on an end surface thereof on the display surface side. Also when only the flange portion 12c is provided as in the cap 1c, an end portion of the first through hole H on the side of the liquid crystal panel 160 can be closed. In this way, the cap 1c also can suppress entrance of foreign substances to some extent by closing the end portion of the first through hole H on the side of the liquid crystal panel 160. That is, when a space between the first and second through holes H and 186 and the tube portion 10c is not completely closed, specifically even when an end portion of the tube portion 10c on the side of the second through hole 186 is opened, the cap 1c can suppress entrance of foreign substances to some extent by placing the tube portion 10c to face the first through hole H and the second through hole 186 and closing the end portion of the tube portion 10c on the display surface side using the flange portion 12c.

A cap 1d illustrated in FIG. 8 includes a flange portion 12d only on the display surface side of the liquid crystal panel 160. In the cap 1d, an end portion of a tube portion 10d on the side of the backlight unit 180 reaches a through hole 192a of the frame 190. The cap 1d can prevent foreign substances, which have been possibly entering the third through hole 2 of the cap 1d, from entering a space between the backlight unit 180 and the frame 190, since the tube portion 10d extends to the through hole 192. As mentioned above, the cap may be formed into various shapes.

When the instrument and display device have the flange portion on the display surface side, i.e. on the liquid crystal panel side, the light leakage can be prevented owing to the flange portion. In this case, a black matrix may be further disposed in the peripheral region of the through hole of the liquid crystal panel in order to make sure that the light leakage is prevented.

<3. Manufacturing Method of Display Device>

Figure 9:
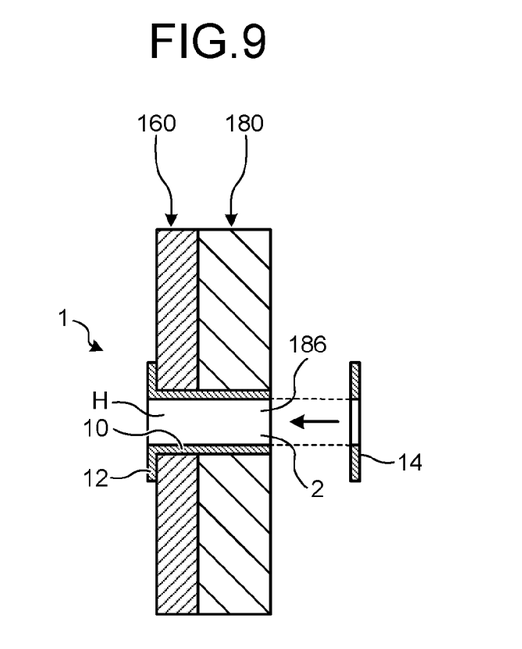
FIG. 9 is a schematic view illustrating an exemplary manufacturing method of a display device.

An explanation will now be made on a manufacturing method of a display device according to an embodiment of the present disclosure. FIG. 9 is a schematic view illustrating an exemplary manufacturing method of a display device. The method illustrated in FIG. 9 is applied to a display device using the cap 1 as illustrated in FIG. 4 or the cap 1a as illustrated in FIG. 5, as a cap.

In the manufacturing method of the display device, the tube portion 10 having the flange portion 12 formed therewith is inserted through the first through hole H and the second through hole 186 from the front surface side of the liquid crystal panel 160 to the back surface side of the backlight unit 180. Accordingly, a state where the tube portion 10 is inserted into the first through hole H and the second through hole 186 is achieved as illustrated in FIG. 9. The flange portion 14 is then connected to an end portion on the backlight unit 180 side of the tube portion 10 inserted through the first through hole H and the second through hole 186. A display device is manufactured by mounting the cap 1 on the first through hole H and the second through hole 186 in this way.

Figure 10:
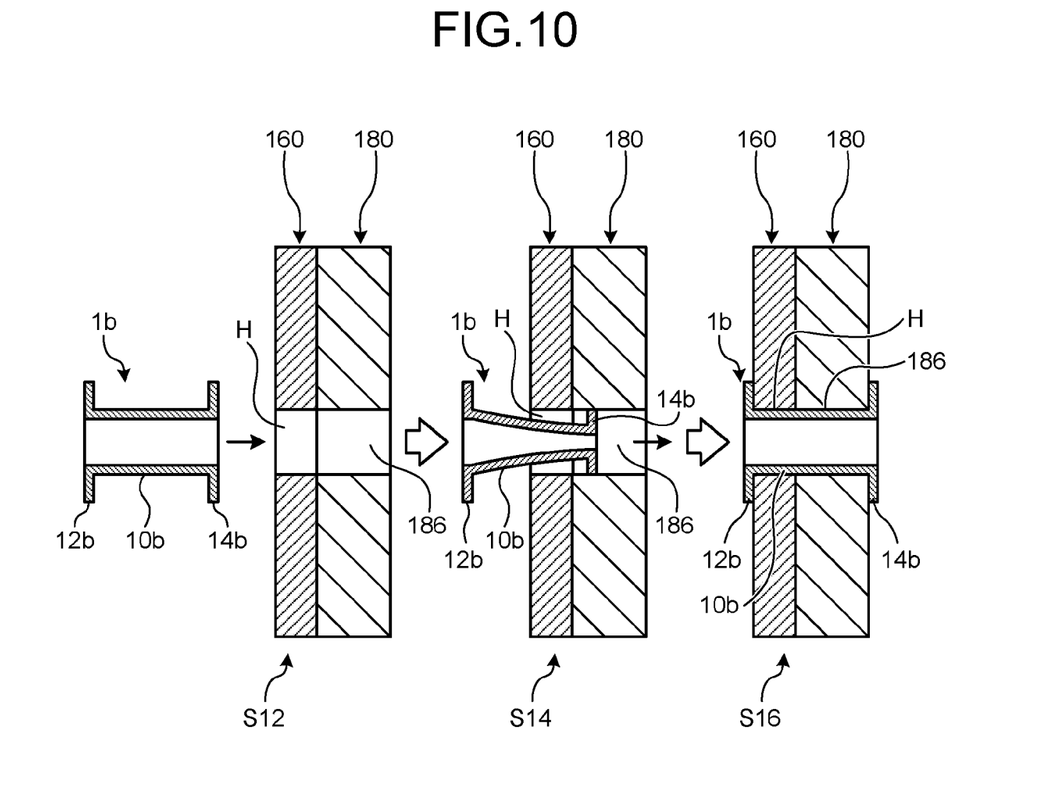
FIG. 10 is a schematic view illustrating another exemplary manufacturing method of a display device.

FIG. 10 is a schematic view illustrating another exemplary manufacturing method of a display device. The method illustrated in FIG. 10 is applied to a display device using the cap 1b as illustrated in FIG. 6, as a cap. According to the manufacturing method of the display device, the cap 1b having the tube portion 10b, and the flange portion 12b and the flange portion 14b formed on both ends of the tube portion 10b is placed near the first through hole H and the second through hole 186 as illustrated at Step S12. Then, the flange portion 14b of the cap 1b is deformed to be smaller than the first through hole H and the second through hole 186 to be inserted from the front surface side of the liquid crystal panel 160 into the first through hole H as illustrated at Step S14. Then, the cap 1b is further pushed to move the flange portion 14b from the first through hole H to the second through hole 186, thereby moving the flange portion 14b to the back surface side of the backlight unit 180 as illustrated at Step S16. Thus, a display device can be also manufactured by inserting the cap 1b into the first through hole H and the second through hole 186 in this way.

According to the present disclosure, a wall surface of the through hole formed through the liquid crystal panel and the backlight can be protected by the cap. Therefore, it is possible to prevent a situation that foreign substances possibly enter inside of the display device from the through hole.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

In the aforementioned embodiments, the explanation has been made on examples where the electronic apparatus according to the present disclosure is applied to the vehicle instruments (vehicle meters). However, the electronic apparatus according to the present disclosure is not limited to vehicle instruments (vehicle meters), and can be applied to various electronic apparatuses such as a clock having a through hole into which a rotational shaft of an indicator needle is inserted. Furthermore, so long as the display device has a through hole, any component other than the rotational shaft may be inserted in the through hole, or no component other than the rotational shaft may be inserted in the through hole.

The present disclosure can employ the following configurations.

(1) A display device for displaying an image on a display surface, the display device comprising:
  a liquid crystal panel having the display surface, the liquid crystal panel with a first through hole formed in the display surface;
  a backlight disposed oppositely to the liquid crystal panel, the backlight with a second through hole formed at a position overlapping with the first through hole; and
  a cap inserted into the first through hole and the second through hole,
   the cap including
   a tube portion with a third through hole formed, the third through hole parallel to the first through hole and the second through hole, and
   a flange portion formed at least one end of the tube portion, the flange portion having an outer diameter larger than a diameter of the first through hole, and larger than a diameter of the second through hole.
(2) The display device according to (1),
  the cap includes the flange portion at one end of the tube portion on a liquid crystal panel side.
(3) The display device according to (1),
  the cap includes the flange portion at both ends of the tube portion.
(4) The display device according to (1),
  the cap is made of non-translucent resin.
(5) The display device according to (1),
  the cap closes a wall surface of the first through hole of the liquid crystal panel.
(6) An electronic apparatus comprising:
  the display device according to (1);
  a control unit to supply an input signal to the display device; and
  a movement mechanism including
   an indicator needle disposed along the display surface of the display device,
   a rotational shaft inserted into the third through hole, and
   a motor to rotate the rotational shaft, the motor disposed on an opposite side of the display device from the display surface.
(7) A method for manufacturing a display device with a through hole formed in a display surface on which an image is displayed, the method comprising:
  aligning a liquid crystal panel having a first through hole formed and a backlight having a second through hole formed so that the first through hole and the second through hole overlap with each other; and
  inserting a cap into the first through hole and the second through hole,
   the cap including
   a tube portion with a third through hole formed, the third through hole parallel to the first through hole and the second through hole, and
   a flange portion formed at least one end of the tube portion, the flange portion having an outer diameter larger than a diameter of the first through hole, and larger than a diameter of the second through hole.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device for displaying an image on a display surface, the display device comprising:
   a liquid crystal panel having a first through hole provided in the display surface;
   a backlight having a second through hole provided at a position overlapping with the first through hole; and
   a cap inserted into the first through hole and the second through hole,
   the cap including
      a tube portion including a first end arranged at the liquid crystal panel side, and
      a first flange portion provided on the first end,
   wherein the first flange portion includes an outer diameter that is larger than a diameter of the first through hole,
   wherein the liquid crystal panel further includes:
      a first substrate having a first substrate hole,
      a second substrate having a second substrate hole,
      a liquid crystal provided between the first substrate and the second substrate, and
      a first polarizer having a first polarizer hole,
   wherein the first through hole passes through from the first substrate to the second substrate,
   wherein a seal is provided between the first substrate and the second substrate so as to surround a periphery of the first through hole and be spaced from the first through hole, and has a seal hole,
   wherein the first through hole includes the first polarizer hole, the first substrate hole, the seal hole, and the second substrate hole, and
   wherein a diameter of the first substrate hole and a diameter of the second substrate hole are each smaller than a diameter of the seal hole.

2. The display device according to claim 1, wherein
   the outer diameter of the first flange portion is larger than the diameter of the seal hole, and
   the first polarizer is sandwiched between the first flange portion and the first substrate.

3. The display device according to claim 1, wherein
   the cap includes a second flange portion provided on a second end arranged at the backlight side of the tube portion.

4. The display device according to claim 1, wherein
   the cap includes non-translucent resin.

5. An electronic apparatus comprising:
   the display device according to claim 1;
   a control unit configured to supply an input signal to the display device; and
   a movement mechanism including
      an indicator needle disposed along the display surface of the display device,
      a rotational shaft inserted into a third through hole that is provided in the tube portion and that is parallel to the first through hole and the second through hole, and
      a motor configured to rotate the rotational shaft, the motor being disposed on an opposite side of the display device to the display surface.

* * * * *